US006955408B1

(12) United States Patent
Schmitt

(10) Patent No.: US 6,955,408 B1
(45) Date of Patent: Oct. 18, 2005

(54) PROCESS AND DEVICE FOR CONTROLLING A VEHICLE BRAKING SYSTEM

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/849,810

(22) PCT Filed: Sep. 19, 1996

(86) PCT No.: PCT/DE96/01828

§ 371 (c)(1), (2), (4) Date: Jan. 26, 1998

(87) PCT Pub. No.: WO97/29001

PCT Pub. Date: Aug. 14, 1997

(30) Foreign Application Priority Data

Feb. 6, 1996 (DE) ................................ 196 04 126

(51) Int. Cl.[7] .............................. B60T 8/00; B60T 8/70

(52) U.S. Cl. .................... 303/191; 303/156; 303/116.4

(58) Field of Search .............................. 303/DIG. 1–4, 303/113.1, 191, 156, 116.4

(56) References Cited

U.S. PATENT DOCUMENTS

| | | | | |
|---|---|---|---|---|
| 4,585,280 | A * | 4/1986 | Leiber | 303/156 |
| 4,591,213 | A * | 5/1986 | Rapoport | 303/191 |
| 4,831,532 | A * | 5/1989 | Kondo | |
| 5,265,947 | A * | 11/1993 | Wupper et al. | 303/156 |
| 5,545,929 | A * | 8/1996 | Fijioka et al. | 303/166 |
| 5,584,543 | A * | 12/1996 | Sawada | 303/191 |
| 5,731,975 | A * | 3/1998 | Nakashima | 303/191 |
| 5,735,585 | A * | 4/1998 | Koike et al. | 303/191 |

* cited by examiner

*Primary Examiner*—Matthew C. Graham
(74) *Attorney, Agent, or Firm*—Kenyon & Kenyon

(57) ABSTRACT

A method and apparatus for controlling the brake system of a vehicle, in which pressure is built up and reduced in the wheel brakes by pulses having at least one changeable parameter. This at least one parameter is corrected as a function of at least one variable that influences the dynamics of the pressure change.

12 Claims, 3 Drawing Sheets

PROCESS AND DEVICE FOR CONTROLLING A VEHICLE BRAKING SYSTEM

FIELD OF THE INVENTION

The present invention relates to a method and apparatus for controlling a brake system of a vehicle.

BACKGROUND INFORMATION

A conventional method and apparatus is described in German Application No. 41 23 783 (corresponding to U.S. Pat. No. 5,419,622). This German Patent Application describes a traction control system where at least one driving wheel has the tendency to spin, and this wheel is braked through the actuation of the associated wheel brake. The brake system disclosed in this document is a hydraulic brake system where pressure is built up and reduced in the wheel brakes through activation of a pressure-generating means (pump) and through actuation of a valve arrangement. To build up and reduce pressure within the framework of the traction control system, in accordance with a conventional method, a sequence of pressure-buildup pulses or pressure-reduction pulses including pulses of predetermined length is established based on the deviation of the wheel speed of the wheel tending to spin from a reference speed.

The above-described conventional method and apparatus do not consider that the dynamics of the pressure buildup or reduction is a function of different factors, such as temperature (outside temperature or temperature of the hydraulics), a change in the base pressure brought about by the pressure-generating means, and/or the level of the voltage supply of the pressure-generating means. Hence, there can be a deterioration of pressure-change dynamics in some cases.

It is therefore the object of the present invention to provide measures for improving the pressure-change dynamics.

In addition to the traction control system, pressure changes occur in at least one wheel brake within the framework of other control or regulating systems, such as an anti-lock brake system, a driving-dynamics regulating system or an electrical brake control. These problems can also occur in these areas of application, both in hydraulic and pneumatic brake systems.

SUMMARY OF THE INVENTION

The object of the present invention is to achieve a pressure-change dynamics in the control of a brake system which is satisfactory in all operational situations.

One of the advantages is that the dynamic response of the pressure buildup and reduction respectively, is effectively prevented from deteriorating under low temperatures, or given a change in the built-up base pressure and/or a change in the supply voltage of the pressure-generating means; a satisfactory dynamic response is achieved in these operational situations.

Accordingly, significant improvements are made to the control system in which the means for achieving the object of the present invention are realized.

The control systems which can benefit from the present invention include traction control systems, anti-lock brake systems, driving-dynamics control systems and/or pressure-control systems within the scope of electrically-controlled brake systems, both when working with hydraulic and pneumatic brake systems.

One advantage of the method and apparatus according to the present invention is that the temperature of the hydraulics or the outside temperature is detected by a corresponding sensor or estimated from the run-on behavior (or after-run effect) of the pressure-generating means after it has been shut off.

FIG. **3*a*** shows a first characteristic curve of a deviation at a driving wheel over time and at a normal temperature.

Figure 3A:
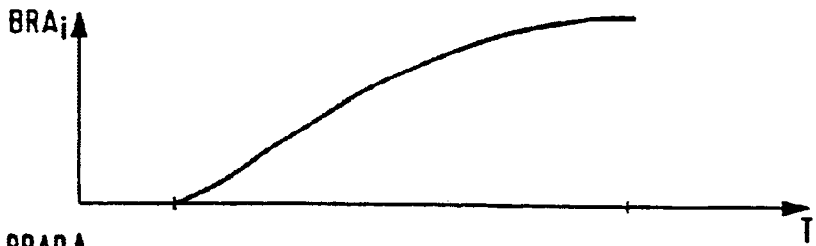

FIG. **3*b* shows a course of a wheel pressure corresponding to the characteristic curve illustrated in FIG. 3*a***.

Figure 3B:
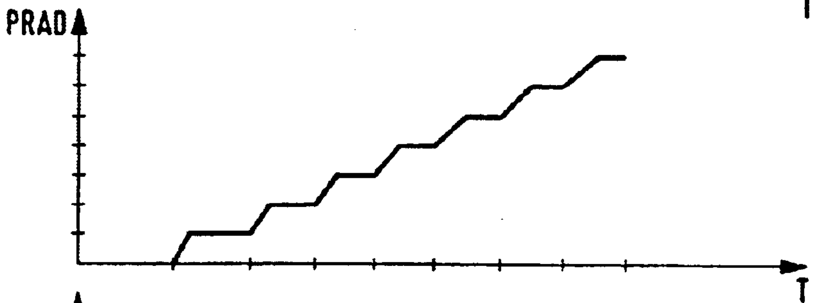

FIG. **3*c* shows pressure-buildup pulses corresponding to the wheel pressure as illustrated in FIG. 3*b***.

FIG. **4*a*** shows a second characteristic curve of the deviation at the driving wheel over time and at a low temperature.

Figure 4A:

FIG. **4*b* shows a course of the wheel pressure corresponding to the characteristic curve illustrated in FIG. 4*a***.

Figure 4B:
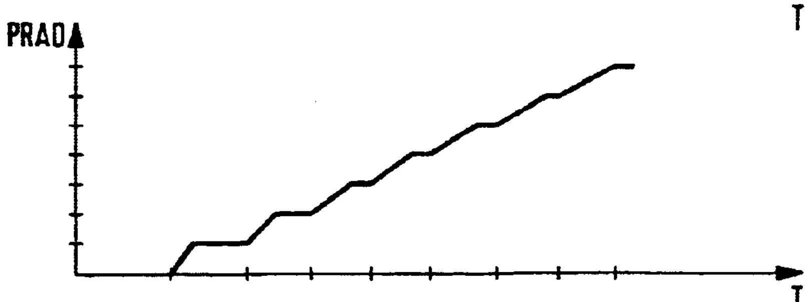

FIG. **4*c* shows pressure-buildup pulses corresponding to the wheel pressure as illustrated in FIG. 4*b***.

DETAILED DESCRIPTION OF THE DRAWINGS

Figure 1:
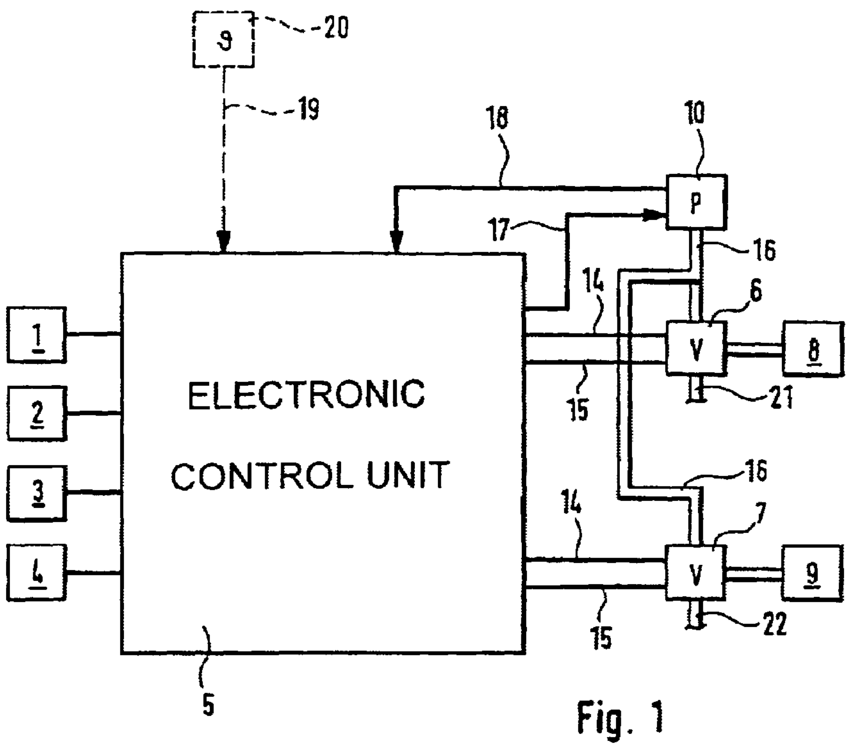
FIG. 1 shows a block diagram of a control device for controlling a brake system according to the present invention.

FIG. 1 shows a block diagram of a control device for a brake system that executes a traction control, an anti-lock brake control, a driving-dynamics control and/or a control, depending on the driver's braking command, through a change in pressure in at least one wheel brake. Shown are speed sensors 1–4, which are connected to the vehicle wheels and, via corresponding signal lines, to an electronic control unit 5. Moreover, two wheel brakes 8 and 9 are shown, which are associated with the driven vehicle wheels in the application of a traction control system. For the sake of a clarity, the wheel brakes of the other wheels are not shown in FIG. 1. Electrically-actuatable valve arrangements 6 and 7, which aid in controlling the pressure in the wheel brakes, are associated with wheel brakes 8 and 9. The valve arrangements 6 and 7 are respectively connected to the electronic control unit via actuation lines 14 and 15. The valves are controlled using these lines for building up and reducing pressure. Furthermore, a pressure source 10 (e.g., a pump) is provided, which builds up a base pressure in the brake lines 16 or draws pressure medium from the brakes via return lines 21, 22. This pressure source is connected via line 17 to the electronic control device for actuation. Moreover, a line 18 leading from pressure source 10 to the electronic control unit 5 transmits an index for the pump motor voltage (potential at a motor terminal). Furthermore, in one embodiment according to the present invention, an input line 19 of control unit 5 is provided that connects the unit to a measuring device 20 for detecting the ambient or hydraulics temperature, and/or the system pressure in brake lines 16. Further input lines, not shown, of control unit 5, for example an input line of a yaw-rate sensor, of pressure sensors, etc., are provided in connection with other applications, e.g. a driving-dynamics control.

From the sensor signals of the wheel-speed sensors 1–4, the electronic control unit 5 obtains control signals for the driven wheels. These control signals indicate whether the tendency to spin exists at at least one wheel (deviation BRA at wheel i>0). If this is the case, pulses are transmitted by the control unit 5 via at least one of lines 14. During the pulse time, these pulses bring valves 6 or 7 into the position in which pressure from pressure source 10 is introduced into brakes 8 or 9. If the control signal then disappears (BRA<0), corresponding pressure-reduction pulses are transmitted via at least one of lines 15 to valves 6 or 7, which are actuated in the manner of a connection of the brake cylinders with return lines 21 and 22, only indicated here.

In one embodiment according to the present invention, when a deviation occurs (BRAi>0) at at least one wheel, a first pressure-buildup pulse having a pulse length T1 becomes effective. If a deviation continues, further buildup pulses of predetermined length are emitted, and effect a change in pressure in the corresponding wheel brake, preferably equal changes in pressure of, for example, 10 bar. These pressure-buildup pulses are emitted until the deviation disappears. Afterward, pressure-reduction pulses are correspondingly generated for reducing the pressure that has built up in the wheel brake. With another occurrence of a deviation, buildup pulses are again emitted, or the control is ended when the deviation diminishes.

Correspondingly, pressure-buildup and pressure-reduction pulses are generated, depending on the driver's braking command, within the framework of an anti-lock brake control, a driving-dynamics control or a pressure control.

Due to the temperature dependency of the hydraulic oil, of the valve-opening times, of the pump delivery, etc., and the dependency of the pressure-buildup speed on the pressure generated by the pump, the pressure-buildup dynamics is not identical in all operational situations. The fundamental concept of the means for achieving the object of the present invention, therefore, is to correct the pressure-buildup and pressure-reduction pulses as a function of variables that influence the dynamics of the pressure change. It is advantageous to select the correction as a function of the temperature of the ambient air or of the hydraulics, as a function of the supply voltage at the pump motor and/or of the system (base) pressure generated by the pump.

The following values were obtained in an embodiment of a brake system according to the present invention (Table 1):

| | Upump | |
|---|---|---|
| Temp. | 9.5 V | 13.0 V |
| +20° | 148 ms (factor 1.0) | 123 ms (factor 1.0) |
| −20° | 396 ms (factor 2.67) | 370 ms (factor 3.0) |
| −30° | 940 ms (factor 6.35) | 808 ms (factor 6.57) |

(Upump: pump motor voltage; Temp: hydraulics temperature)

In an embodiment according to the present invention, the temperature of the ambient air or the hydraulics is detected by an integral measuring device. In another embodiment according to the present invention, the temperature is derived from the run-on of the pump. It has been seen that the period of time between the pump shutoff and the point at which the pump motor voltage or the rotational speed of the pump falls below a predefined threshold value is a measure for the temperature of the hydraulics or the ambient air.

According to the present invention, the actuation times of the solenoid valves are corrected by a factor when a low temperature is detected, so that the corrected pulse length effects a predetermined pressure buildup in the respective wheel brake. The pulse lengths shown in the table yield a pressure buildup of 10 bar. Correspondingly, a dependency on the pump motor voltage or on the system pressure of the pressure source is apparent. In this context, the lower voltage value shown in the table represents a permissible limit value for the pump motor voltage. Below this voltage range, a fault condition is assumed.

Figure 2:
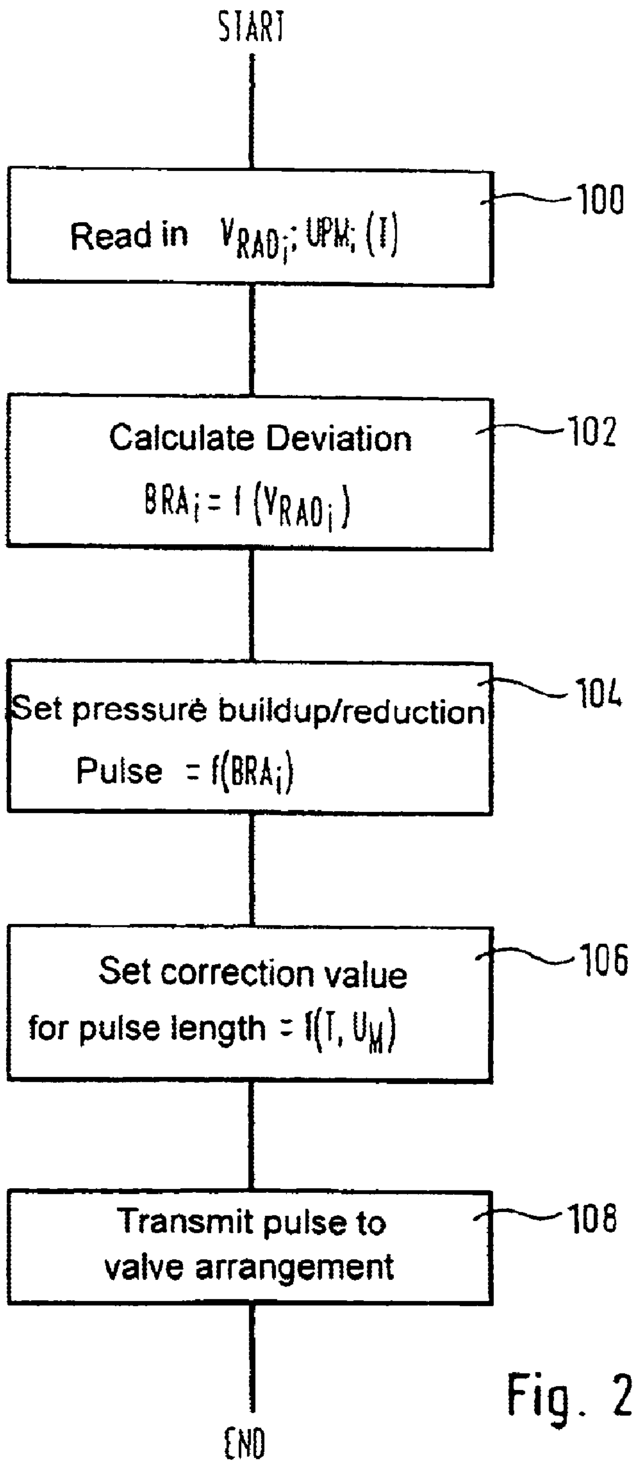
FIG. 2 shows a flow chart of an embodiment of the present invention that operates as a program in a microcomputer that is a component of the control device.

FIG. 2 shows a flow chart to illustrate an implementation according to the present means for achieving the object of the invention as a computer program. After the program segment is started at predefined points in time, wheel speed VRADi, pump motor voltage UPM and, optionally, temperature T of the ambient air or the hydraulics are read in during a first step 100. Thereafter, in step 102, deviation BRAi is calculated for the driving wheels of the vehicle in a known manner, based on the wheel speeds VRADi. In the following step, 104, pressure-buildup or pressure-reduction pulses are formed for each wheel as a function of the determined deviation BRAi. In the following step, 106, the correction values for the pulse length are determined from a predefined table as a function of the detected or estimated temperature and/or the pump motor voltage; in the subsequent step, 108, the pulse length is correspondingly corrected, preferably through multiplication or addition of the original pulse length and the determined correction factor, and transmitted to the valve arrangement of the wheel brake or brakes. Thereafter, the program segment is ended and repeated in due course.

Figure 3C:
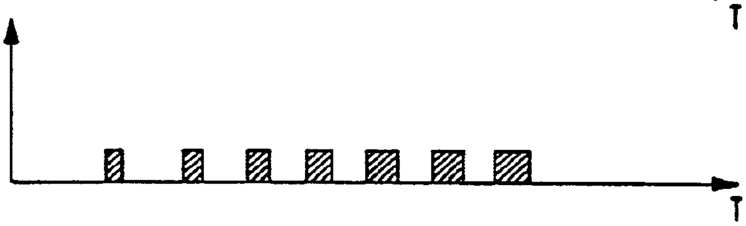

FIGS. 3*a*–3*c* and 4*a*–4*c* illustrate time diagrams that explain the mode of operation of the invention. FIGS. 3*a* and 4*a* respectively show the characteristic curve of the deviation BRAi at a driving wheel over time, while FIGS. 3*b* and 4*b* respectively show the corresponding course of the wheel pressure and FIGS. 3*c* and 4*c* respectively show the pressure-buildup pulses. FIGS. 3*a*–3*c* describe the situation involving a normal temperature, while FIGS. 4*a*–4*c* describe illustrates a low-temperature situation.

Figure 4C:
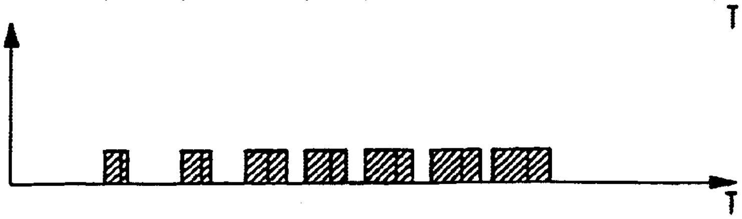

From a specific point in time on, a driving wheel tends to spin. This increases the deviation BRA for this driving wheel, as shown in the identical representations in FIGS. 3*a* and 4*a*. Within the framework of the traction control system, pressure is built up for reducing the spinning tendency and for reducing the deviation through corresponding pulse actuation of the valves. FIG. 3*b* shows the step-wise pressure buildup corresponding to the emitted pulses. The pulses effecting the pressure buildup are shown in FIG. 3*c*. They increase with an increasing pressure level, because the pressure-increase times become longer as a consequence of the reduced pressure difference, and longer valve-opening times are then necessary for attaining a uniform pressure buildup. According to the present invention, the pulse length is corrected at low temperatures in response to the temperature, that is, it is prolonged in response to the pressure buildup. An objective according to the present invention is to attain the pressure increase that is provided at normal operating temperatures, even at low temperatures. To attain a dynamics in the pressure buildup that is comparable to that shown in FIG. 3*b*, the pulse lengths are prolonged as shown in FIG. 4*c*, starting from the pulse lengths of FIG. 3*c*. In this context, the result is an increasing prolongation with an increasing original pulse length.

Such measures are also applied in the pressure reduction process.

The dependency of the pressure-buildup dynamics on the pump motor voltage or on the attained system pressure yields corresponding results.

In another embodiment according to the present invention, the pause time between two pulses, or the frequency or period of the signal or, generally, the at least one changeable parameter of the at least one control signal (also in the case of continuous control signals) is adapted, rather than the pulse length.

What is claimed is:

1. A method for controlling a brake system of a vehicle, the method comprising the steps of:

obtaining at least one wheel speed, a pump motor voltage and at least one temperature parameter, the at least one temperature parameter being at least one of an ambient air temperature and a hydraulics temperature associated with the brake system;

determining a deviation based on the at least one wheel speed;

establishing a driving signal for the braking system based on the at least one wheel speed for changing a braking pressure;

determining a correction value for correcting the driving signal based on the pump motor voltage and the at least one of the ambient air temperature and the hydraulics temperature associated with the brake system; and correcting the driving signal based on the correction value.

2. The method of claim 1, wherein the driving signal is a pulsed driving signal.

3. The method of claim 2, wherein the pulsed driving signal is corrected based on the correction value by changing a pulse length of the pulsed driving signal.

4. The method of claim 3, wherein the step of determining the correction value includes the step of obtaining another pulse length from a table of at least one of pulse lengths and actuation times.

5. The method of claim 4, wherein the table includes at least one of the pump motor voltage and the at least one temperature parameter.

6. The method of claim 4, wherein the table includes at least the pump motor voltage and the at least one temperature parameter.

7. An control arrangement for controlling a brake system of a vehicle, the control arrangement comprising:

a first arrangement for obtaining at least one wheel speed, a pump motor voltage and at least one temperature parameter, the at least one temperature parameter being at least one of an ambient air temperature and a hydraulics temperature associated with the brake system;

a second arrangement for determining a deviation based on the at least one wheel speed;

a third arrangement for establishing a driving signal for the braking system based on the at least one wheel speed for changing a braking pressure;

a fourth arrangement for determining a correction value for correcting the driving signal based on the pump motor voltage and the at least one of the ambient air temperature and the hydraulics temperature associated with the brake system; and a fifth arrangement for correcting the driving signal based on the correction value.

8. The control arrangement of claim 7, wherein the driving signal is a pulsed driving signal.

9. The control arrangement of claim 8, wherein the pulsed driving signal is corrected based on the correction value by changing a pulse length of the pulsed driving signal.

10. The control arrangement of claim 9, wherein the fourth arrangement for determining the correction value includes another arrangement for obtaining another pulse length from a table of at least one of pulse lengths and actuation times.

11. The control arrangement of claim 10, wherein the table includes at least one of the pump motor voltage and the at least one temperature parameter.

12. The control arrangement of claim 10, wherein the table includes at least the pump motor voltage and the at least one temperature parameter.

* * * * *